United States Patent
Wang

(10) Patent No.: US 8,726,836 B2
(45) Date of Patent: May 20, 2014

(54) LIQUID CRYSTAL COATING APPARATUS AND LIQUID CRYSTAL COATING METHOD

(75) Inventor: Yun Wang, Shenzhen (CN)

(73) Assignee: Shenzhen China Optoelectronics Technology Co., Ltd., Shenzhen, Guangdong (CN)

( * ) Notice: Subject to any disclaimer, the term of this patent is extended or adjusted under 35 U.S.C. 154(b) by 509 days.

(21) Appl. No.: 13/000,379

(22) PCT Filed: Nov. 24, 2010

(86) PCT No.: PCT/CN2010/079034
§ 371 (c)(1),
(2), (4) Date: Dec. 21, 2010

(87) PCT Pub. No.: WO2012/031431
PCT Pub. Date: Mar. 15, 2012

(65) Prior Publication Data
US 2012/0064224 A1 Mar. 15, 2012

(30) Foreign Application Priority Data

Sep. 10, 2010 (CN) .......................... 2010 1 0283863

(51) Int. Cl.
*B05C 11/00* (2006.01)
*C23C 16/52* (2006.01)
*B05D 5/12* (2006.01)

(52) U.S. Cl.
USPC ................................. 118/710; 427/8; 427/58

(58) Field of Classification Search
USPC .............................................. 427/8; 118/710
See application file for complete search history.

(56) References Cited

U.S. PATENT DOCUMENTS

| | | | |
|---|---|---|---|
| 6,423,144 B1 * | 7/2002 | Watanabe | 118/669 |
| 6,641,670 B2 * | 11/2003 | Tsujii et al. | 118/610 |
| 6,863,730 B2 * | 3/2005 | Trabold et al. | 118/324 |
| 2006/0027164 A1 * | 2/2006 | Jung | 118/407 |
| 2006/0141130 A1 * | 6/2006 | Kwon et al. | 427/58 |
| 2010/0209614 A1 * | 8/2010 | Sakata et al. | 427/402 |

FOREIGN PATENT DOCUMENTS

| | | |
|---|---|---|
| CN | 101498868 A | 8/2009 |
| JP | 2005061866 A | 3/2005 |
| JP | 2006320808 A | 11/2006 |
| JP | 2010131562 A | 6/2010 |
| JP | 2010137127 A | 6/2010 |
| WO | 2010090080 A1 | 8/2010 |

* cited by examiner

*Primary Examiner* — Michael Cleveland
*Assistant Examiner* — Austin Murata
(74) *Attorney, Agent, or Firm* — Soroker-Agmon

(57) ABSTRACT

The present invention provides a liquid crystal (LC) coating apparatus and an LC coating method. The LC coating apparatus comprises a plurality of liquid crystal coating devices, at least one real-time detector and a controller. The LC coating method comprises the following steps: utilizing the LC coating devices to coat a LC on a substrate; utilizing the real-time detector to real-time detect the LC coated on the substrate and outputting a detection signal; and utilizing the controller to control the LC coating devices according to the detection signal. The present invention can real-time monitor the coating status of the LC for coating and forming a uniform LC film.

6 Claims, 4 Drawing Sheets

LIQUID CRYSTAL COATING APPARATUS AND LIQUID CRYSTAL COATING METHOD

FIELD OF THE INVENTION

The present invention relates to a liquid crystal (LC) coating apparatus and an LC coating method, and more particularly to an LC coating apparatus and an LC coating method capable of real-time monitoring the LC coating status and forming a uniform LC film.

BACKGROUND OF THE INVENTION

Liquid crystal displays (LCDs) have been widely applied in electrical products. Currently, most of LCDs are backlight type LCDs which comprise an LC panel and a backlight module.

The LC panel is composed of two transparent substrates and an LC sealed there-between. In an assembly process of the LC panel, the LC is filled and sealed between the transparent substrates. Currently, the methods for filling the LC between the transparent substrates may be a vacuum siphon method and a one-drop filling (ODF) method.

However, the filling time of the conventional vacuum siphon method is too long, and thus the vacuum siphon method can be not applicable to large-scale panels. Furthermore, the machine used for the ODF method is too expensive, and the process thereof is more complicated. Besides, when the dispensed amount (about 0.5 mg-1.5 mg) of the LC is not precise, the problems of bubbles or non-uniform coating are susceptible to arise.

As a result, it is necessary to provide an LC coating apparatus and an LC coating method to solve the problems existing in the conventional technologies, as described above.

SUMMARY OF THE INVENTION

A primary object of the present invention is to provide a liquid crystal coating apparatus, and the liquid crystal coating apparatus comprises: a plurality of liquid crystal coating devices configured to coat a liquid crystal on a substrate, wherein the liquid crystal coating devices are inkjet printing heads or slit coating heads; at least one real-time detector disposed at one side of the liquid crystal coating devices configured to real-time detect the liquid crystal coated on the substrate and output a detection signal; and a controller configured to control the liquid crystal coating devices according to the detection signal.

Another object of the present invention is to provide a liquid crystal coating method, and the method comprises the following steps: utilizing a plurality of liquid crystal coating devices to coat a liquid crystal on a substrate, wherein the liquid crystal coating devices are inkjet printing heads or slit coating heads; utilizing at least one real-time detector to real-time detect the liquid crystal coated on the substrate and outputting a detection signal; and utilizing a controller to control the liquid crystal coating devices according to the detection signal.

In one embodiment of the present invention, the liquid crystal coating devices are piezoelectric droplet ejectors, and the controller adjusts a voltage of the liquid crystal coating devices according to a relation between a droplet amount and the voltage.

In one embodiment of the present invention, the real-time detector is at least one charge coupled device configured to real-time detect the liquid crystal coated on the substrate and output the detection signal to the controller, and the detection signal is a real-time image signal, and the controller implements an image gray-scale comparison processing for the real-time image signal outputted from the real-time detector, so as to calculate the actual weight, number, size or position of the liquid crystal coated on the substrate.

In one embodiment of the present invention, the liquid crystal coating devices are the slit coating heads, and the liquid crystal coating apparatus further comprises a plurality of measuring cylinders, a pumping device and a liquid crystal tank, and the measuring cylinders are connected to the liquid crystal coating devices respectively configured to provide the liquid crystal to the liquid crystal coating devices, and the pumping device is connected between the measuring cylinders and the liquid crystal tank for pumping the liquid crystal from the liquid crystal tank to the measuring cylinders.

In one embodiment of the present invention, the liquid crystal amount of each of the measuring cylinders is a liquid crystal coated amount for one or more liquid crystal units.

In one embodiment of the present invention, the controller adjusts a moving speed of the liquid crystal coating devices, a pressure of the measuring cylinders, a slit width of the slit coating heads or a pitch between each two of liquid crystal units by calculating a liquid crystal amount for the liquid crystal units and a moving distance in coating.

In one embodiment of the present invention, the liquid crystal coating devices are the inkjet printing heads, and the liquid crystal coating method further comprises the following step: before coating the liquid crystal on the substrate, ensuring whether a number and a weight of liquid crystal droplets ejected by the liquid crystal coating devices satisfy a predetermined requirement.

In one embodiment of the present invention, the liquid crystal coating devices are the inkjet printing heads, and the controller calculates the number of the droplets of the liquid crystal ejected by the liquid crystal coating devices according to the real-time image signal, and implements a comparison between the number and a predetermined droplet number, and then adjusts the ejection of the liquid crystal coating devices according to a comparison result.

The LC coating apparatus and the LC coating method of the present invention can rapidly coat and form the LC film on the transparent substrate, thereby considerably raising the production efficiency and simplifying the manufacturing process to reduce the labor and time. Furthermore, the problems of bubbles or non-uniform LC film can be improved by the LC coating apparatus of the present invention, and in this way, the LC coated amount, thickness and uniformity can be precisely controlled.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
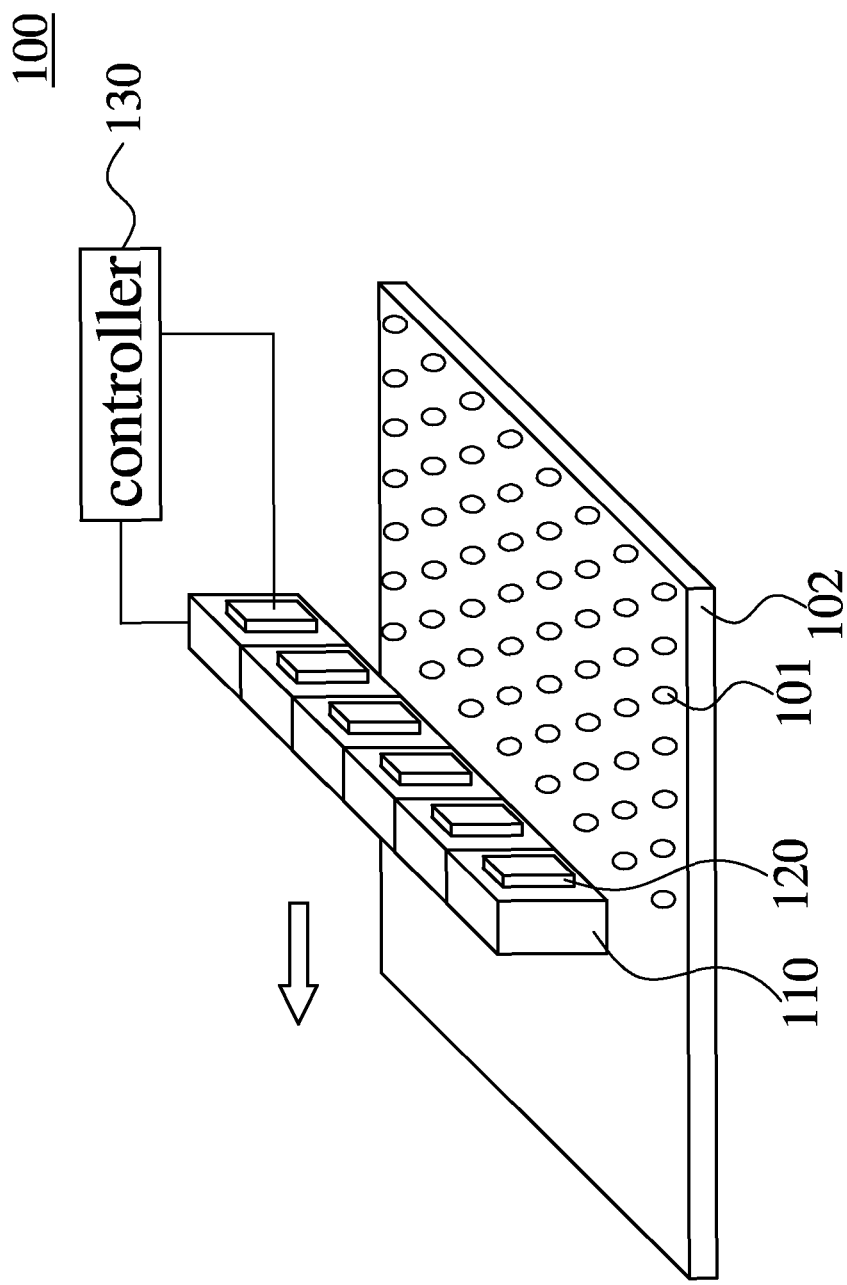
FIG. 1 is a schematic diagram showing an LC coating apparatus according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a schematic diagram showing an LC coating apparatus according to a first embodiment of the present invention is illustrated. The LC coating apparatus 100 of the present embodiment may be configured to coat and form an LC 101 between two transparent substrates 102, thereby forming an LC display panel. The LC coating apparatus 100 comprises a plurality of LC coating devices 110, a plurality of real-time detectors 120 and a controller 130. The LC coating devices 110 are configured to coat the LC 101 on one of the transparent substrates 102, wherein the LC coating devices 110 may be inkjet printing heads or slit coating heads. The real-time detectors 120 are disposed at one side of the LC coating devices 110 configured to real-time detect the status of the LC coated on the transparent substrate 102 and output a detection signal to the controller 130. The controller 130 is electrically connected to the LC coating devices 110 and the real-time detectors 120 and can control the coating of the LC coating devices 110 according to the detection signal outputted from the real-time detectors 120.

Referring to FIG. 1 again, in this embodiment, the LC coating devices 110 may be, for example, the inkjet printing heads configured to eject droplets of the LC 101 with a high density on a transparent substrate 102, wherein the weight of each droplet of the LC 101 ejected by the LC coating devices 110 may be less than 1 mg, preferably less than 0.1 mg. A pitch between each two adjacent droplets of the LC 101 ejected by the LC coating devices 110 may be less than 1 mm, preferably less than 200 μm. The droplets of the LC 101 ejected by the LC coating devices 110 are arranged on the transparent substrate 102 densely, thus naturally spreading as a uniform LC film under the action of the surface tension for significantly improving the non-uniform droplet problem of the conventional ODF method.

Referring to FIG. 1 again, the LC coating devices 110 of the present embodiment may be, for example, piezoelectric droplet ejectors which can control the amount or size of the droplets ejected by the LC coating devices 110 using a voltage. In this embodiment, the droplet amount ejected by each droplet ejector can be measured in advance, so as to obtain a relation between the droplet amount of each ejector and the voltage. Normally, the droplet amount of each ejector is proportional to the voltage. Subsequently, the voltage of each of the ejectors can be adjusted according to the relation between the droplet amount and the voltage, thereby allowing the droplet amount ejected by each of the ejectors (the LC coating devices 110) being identical.

Referring to FIG. 1 again, the real-time detectors 120 of the present embodiment are configured to real-time monitor the coating status of the LC coating devices 110, such as the weight, number, size or position of the LC coated on the transparent substrate 102, and the real-time detectors 120 can output the detection signal to the controller 130. In this embodiment, the real-time detectors 120 may be, for example, charge coupled devices (CCD) disposed at one side of each of the LC coating devices 110 for real-time detecting the LC coated on the transparent substrate 102, and the real-time detectors can transmit a real-time image signal (the detection signal) to the controller 130.

Referring to FIG. 1 again, the controller 130 of the present embodiment can control the coating of the LC coating devices 110 according to the detection signal outputted from the real-time detectors 120. In this embodiment, the controller 130 can implement an image gray-scale comparison processing for the real-time image signal (the detection signal) outputted from the real-time detectors 120, so as to calculate the actual weight, number, size or position of the LC coated on the transparent substrate 102. Subsequently, according to the actual coating status of the LC coated on the transparent substrate 102, the controller 130 may, for example, adjust the voltage of the LC coating devices 110, so as to adjust the LC amount ejected by the LC coating devices 110.

Figure 2:
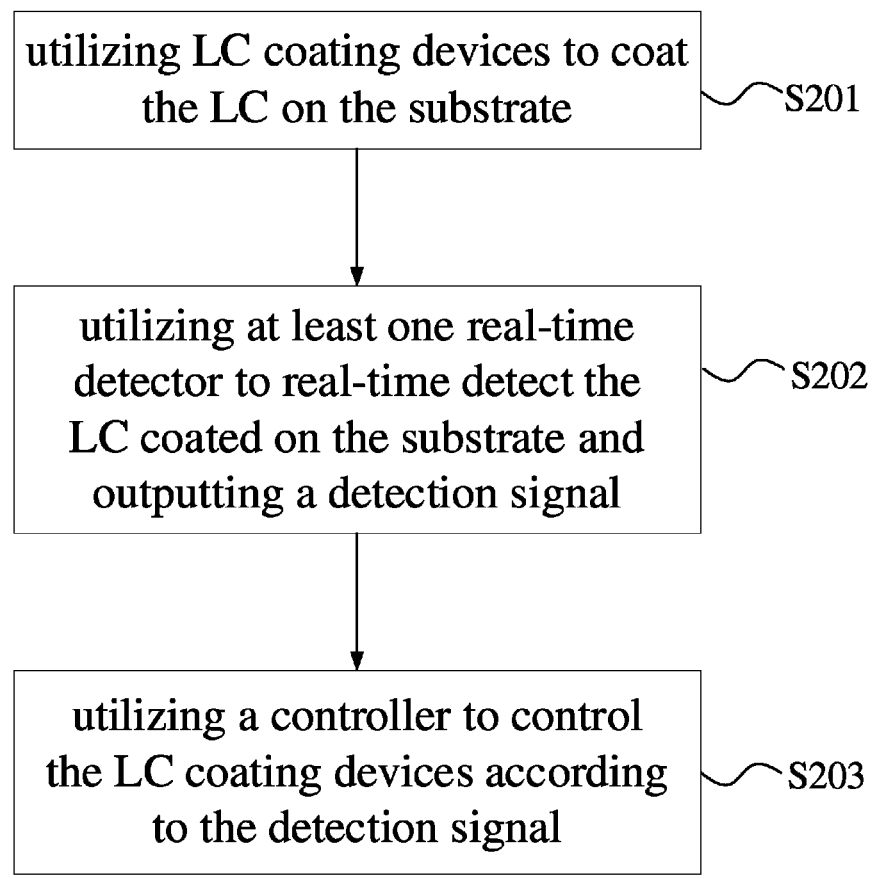
FIG. 2 is a flow diagram showing an LC coating method according to the first embodiment of the present invention.

Referring to FIG. 2, a flow diagram showing an LC coating method according to the first embodiment of the present invention is illustrated. When utilizing the LC coating apparatus 100 of the present embodiment to coat and form the LC 101 on the transparent substrate 102, the LC coating method of the present embodiment may comprise the following steps: utilizing the LC coating devices 110 to coat the LC 101 on the transparent substrate 102 (step S201); utilizing the real-time detectors 120 to real-time detect the LC coated on the transparent substrate 102 and outputting the detection signal (step S202); and utilizing the controller 130 to control the LC coating devices 110 according to the detection signal (step S203). Before the step S201, for example, the real-time detectors 120 can be utilized to detect the number of the LC droplets ejected by the LC coating devices 110 in advance, and the weight of the LC droplets can be measured, so as to ensure whether the number and weight of the LC droplets ejected by the LC coating devices 110 satisfy a predetermined requirement. In the step S201, the LC coating devices 110 can move toward a predetermined direction, and thus the LC coating devices 110 can coat the LC 101 on the transparent substrate 102 toward the predetermined direction. In the step S202, for example, the real-time detectors 120 may real-time record an image of the droplets of the LC 101 on the transparent substrate 102 and output the real-time image signal (the detection signal) to the controller 130. In the step S203, for example, the controller 130 may calculate the number of the droplets of the LC 101 ejected by the LC coating devices 110 according to real-time image signal, and implement a comparison between the number and a predetermined droplet number, and then adjust the ejection (coating) of the LC coating devices 110 according to the comparison result.

Therefore, the LC coating apparatus 100 of the present embodiment can utilize the inkjet printing heads to coat and form a uniform LC film on one transparent substrate 102, and another transparent substrate 102 can be assembled on the transparent substrate 102 with the LC film using a sealant, thereby forming the LC display panel.

Figure 3A:
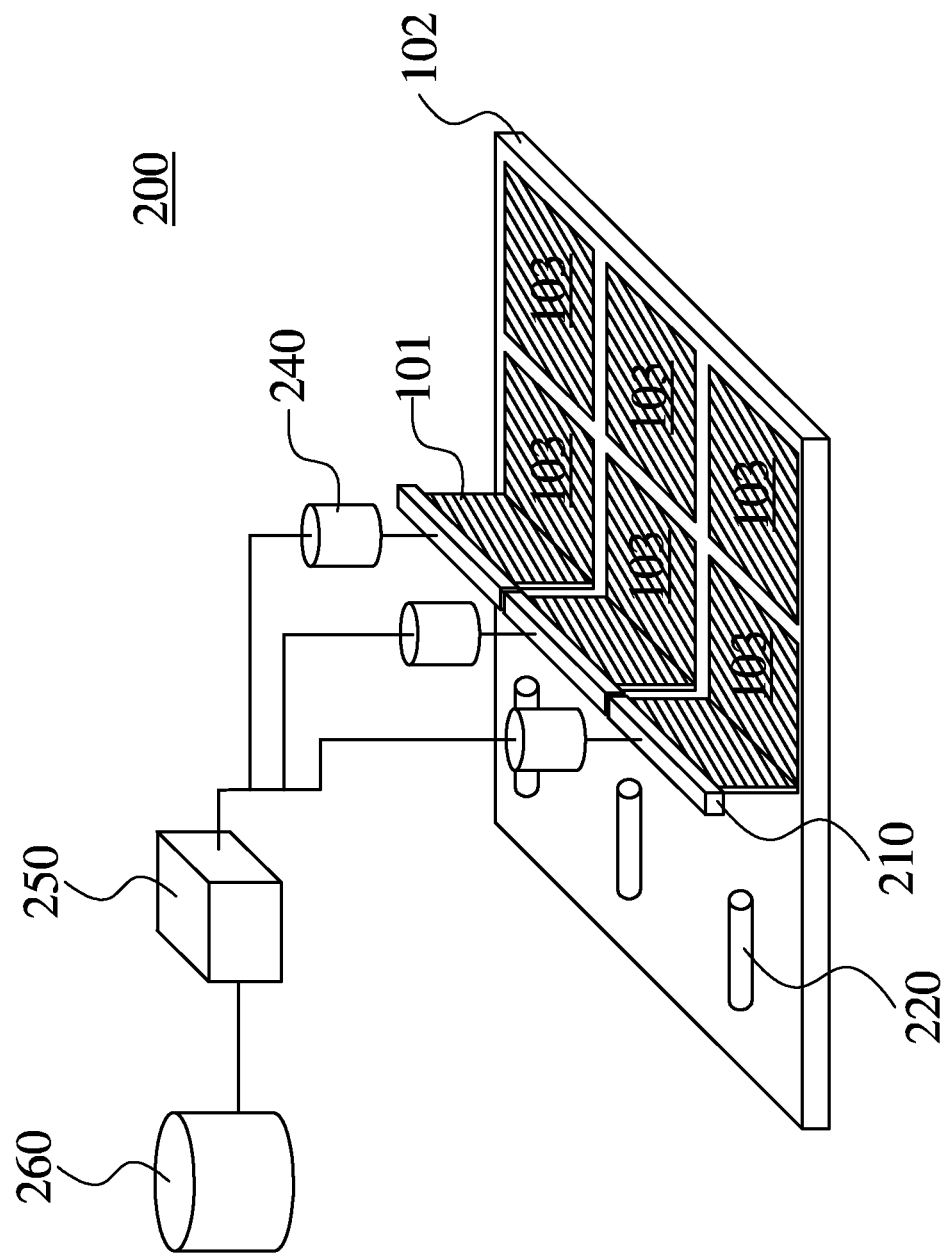
FIG. 3A is a schematic diagram showing an LC coating apparatus according to a second embodiment of the present invention.
Figure 3B:
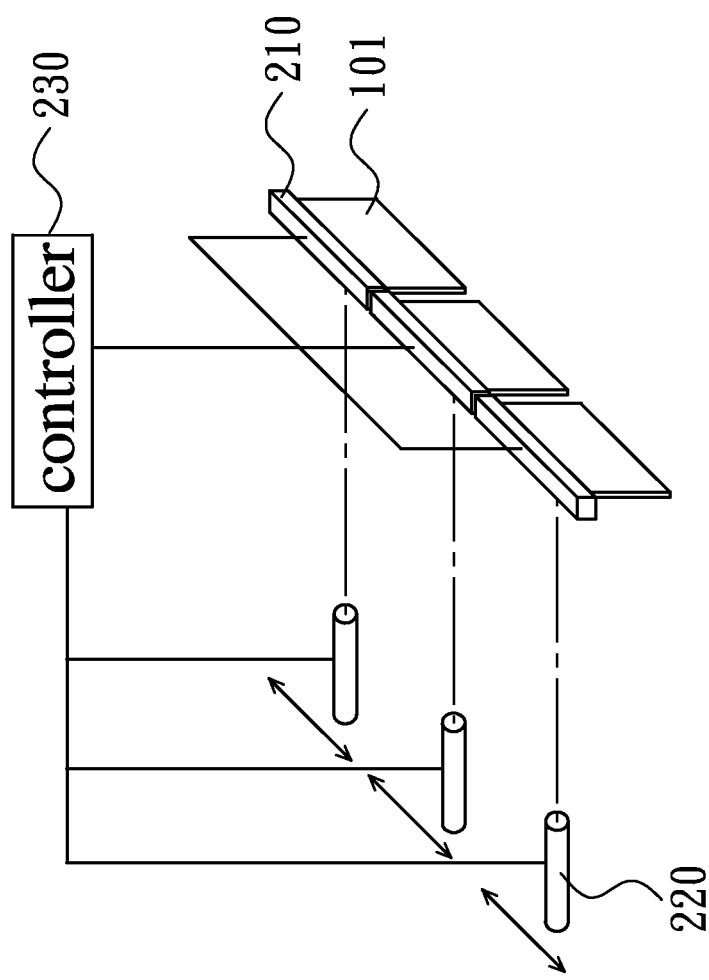
FIG. 3B is a partially schematic diagram showing an LC coating apparatus according to the second embodiment of the present invention.

Referring to FIG. 3A and FIG. 3B, schematic diagrams showing an LC coating apparatus according to a second embodiment of the present invention are illustrated. The LC coating apparatus 200 of the second embodiment comprises a plurality of LC coating devices 210, a plurality of real-time detectors 220 and a controller 230, a plurality of measuring cylinders 240, a pumping device 250 and an LC tank 260. The LC coating devices 210 are configured to coat the LC 101 on the transparent substrate 102, wherein the LC coating devices 210 may be, for example, slit coating heads. The real-time detectors 220 are disposed at one side of the LC coating devices 210 configured to real-time detect the status of the LC coated on the transparent substrate 102 and output a detection signal to the controller 230, wherein the real-time detectors 220 may be image sensors disposed at one side of each LC coating device 210 and capable of laterally moving when coating the LC (referring to FIG. 3B), so as to real-time detect whether the flow rate of the LC ejected by the LC coating devices 210 is uniform, thereby real-time detecting the LC film coated by the slit coating heads 210 and outputting a real-time image signal (the detection signal) to the controller 230. The controller 230 can implement an image processing for the detection signal outputted from the real-time detectors 220, so as to obtain a real-time LC coating amount and control the ejection amount or coating of the LC coating devices 210.

Referring to FIG. 3A again, the measuring cylinders 240 are connected to the LC coating devices 210 respectively configured to provide the LC 101 to the LC coating devices 210, and thus the LC coating devices 210 can coat the LC 101 on the transparent substrate 102. In this embodiment, the measuring cylinders 240 may include sensors (not shown) for detecting the LC amount within the measuring cylinders 240. Therefore, the LC amount provide by the measuring cylinders 240 to the LC coating devices 210 can be obtained for monitoring the LC amount within the measuring cylinders 240 and the coating amount of the LC coating devices 210. In this case, the measuring cylinders 240 can provide the LC 101 to the LC coating devices 210 by a pressure of a gas (such as $N_2$). The pumping device 250 may be, for example, a pump connected between the measuring cylinders 240 and the LC tank 260 for pumping the LC from the LC tank 260 to the measuring cylinders 240. The LC tank 260 is connected to the pumping device 250 for storing the LC.

Referring to FIG. 3A again, when utilizing the LC coating apparatus 100 of the present embodiment to coat and form the LC 101 on the transparent substrate 102, firstly, the pumping device 250 can pump the LC from the LC tank 260 to the measuring cylinders 240, wherein the LC amount of each of the measuring cylinders 240 may be the LC coated amount for one or more LC units (LC display panels). Subsequently, the measuring cylinders 240 can provide the LC 101 to the LC coating devices 210 by the pressure of the gas (such as $N_2$). Subsequently, the LC coating devices 210 can coat the LC 101 on the transparent substrate 102, wherein the LC coating devices 210 can coat the LC 101 on the transparent substrate 102 toward the predetermined direction. Subsequently, the real-time detectors 220 can detect the LC 101 coated on the transparent substrate 102 and output the detection signal. Subsequently, the controller 230 can control the coating of the LC coating devices 210 according to the detection signal. Furthermore, the controller 230 can control the pressure or a slit width of the slit coating heads.

Referring to FIG. 3A again, in the second embodiment, the LC coating devices 210 can coat the LC 101 on a plurality of regions of the transparent substrate 102 at the same time for forming a plurality of LC units 103 which are cut and assembled as LC display panels. At this time, each of the LC coating devices 210 may be configured to coat a LC unit 103, and the controller 230 can adjust the moving speed of the LC coating devices 210, the pressure of the measuring cylinders 240, the slit width of the slit coating heads or a pitch between each two of the LC units 103 by calculating the LC amount for the LC units 103 and a moving distance in coating, so as to enhancing the uniformity of the LC film of each of the LC units 103. Moreover, when the LC coating devices 210 move between each two of the LC units 103, the pumping device 250 can pump the LC from the LC tank 260 to the measuring cylinders 240 for renewing the LC amount thereof the measuring cylinders 240.

As described above, in comparison with the conventional LC coating method, the LC coating apparatus and the LC coating method of the present invention can rapidly coat and form the LC film on the transparent substrate, thereby considerably raising the production efficiency. Furthermore, the steps of the LC coating method are very simple, thereby reducing the labor and time. Besides, the LC coating apparatus of the present invention can coat the LC film with high uniformity for improving the problems of bubbles or non-uniform LC film. Moreover, the LC coating apparatus includes the real-time detector to real-time detect the coating status of the LC for precisely controlling the LC coated amount, thickness and uniformity to improve the LC coating quality and reduce the waste of the LC.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A liquid crystal coating apparatus, characterized in that: the liquid crystal coating apparatus comprises:
    a plurality of liquid crystal coating devices configured to coat a liquid crystal on a substrate, wherein the liquid crystal coating devices are or slit coating heads;
    at least one real-time detector disposed at one side of the liquid crystal coating devices configured to real-time detect the liquid crystal coated on the substrate and output a detection signal; and
    a controller configured to control the liquid crystal coating devices according to the detection signal,
    wherein the liquid crystal coating apparatus further comprises a plurality of measuring cylinders, a pumping device and a liquid crystal tank, and the measuring cylinders are connected to the liquid crystal coating devices respectively configured to provide the liquid crystal to the liquid crystal coating devices, and the pumping device is connected between the measuring cylinders and the liquid crystal tank for pumping the liquid crystal from the liquid crystal tank to the measuring cylinders, and
    wherein the controller adjusts a moving speed of the liquid crystal coating devices, a pressure of the measuring cylinders, a slit width of the slit coating heads or a pitch between each two of liquid crystal units by calculating a liquid crystal amount for the liquid crystal units and a moving distance in coating.

2. The liquid crystal coating apparatus according to claim 1, characterized in that: a liquid crystal amount of each of the measuring cylinders is a liquid crystal coated amount for one or more liquid crystal units.

3. The liquid crystal coating apparatus according to claim 1, characterized in that: the measuring cylinders include sensors for detecting the liquid crystal amount within each of the measuring cylinders.

4. The liquid crystal coating apparatus according to claim 1, characterized in that: the controller controls a pressure of the measuring cylinders according to the detection signal.

5. The liquid crystal coating apparatus according to claim 1, characterized in that: the controller controls a slit width of the slit coating heads according to the detection signal.

6. The liquid crystal coating apparatus according to claim 1, characterized in that: the liquid crystal coating devices are the slit coating heads, and the real-time detector is at least one image sensor configured to real-time detect the flow rate of the liquid crystal and outputting a real-time image signal to the controller.

* * * * *